(12) United States Patent
Bian et al.

(10) Patent No.: US 11,747,560 B2
(45) Date of Patent: Sep. 5, 2023

(54) PHOTONIC INTEGRATED CIRCUIT STRUCTURE WITH A TAPERED END PORTION OF ONE WAVEGUIDE ADJACENT TO A V-SHAPED END PORTION OF A DIFFERENT WAVEGUIDE

(71) Applicant: GLOBALFOUNDRIES U.S. Inc., Malta, NY (US)

(72) Inventors: Yusheng Bian, Ballston Lake, NY (US); Roderick A. Augur, Saratoga Springs, NY (US)

(73) Assignee: GlobalFoundries U.S. Inc., Malta, NY (US)

(*) Notice: Subject to any disclaimer, the term of this patent is extended or adjusted under 35 U.S.C. 154(b) by 0 days.

(21) Appl. No.: 17/411,122

(22) Filed: Aug. 25, 2021

(65) Prior Publication Data
US 2023/0067304 A1    Mar. 2, 2023

(51) Int. Cl.
*G02B 6/122* (2006.01)
*G02B 6/125* (2006.01)
(Continued)

(52) U.S. Cl.
CPC .......... *G02B 6/1228* (2013.01); *G02B 6/125* (2013.01); *G02B 6/136* (2013.01); *G02B 2006/12061* (2013.01)

(58) Field of Classification Search
CPC ....................................................... G02B 6/125
See application file for complete search history.

(56) References Cited

U.S. PATENT DOCUMENTS

| 4,756,587 A | 7/1988 | Sano et al. |
| 5,222,163 A * | 6/1993 | Handa ........................ H01S 5/10 385/14 |

(Continued)

FOREIGN PATENT DOCUMENTS

| CN | 110658586 A | 1/2020 |
| CN | 114460682 A | 5/2022 |

OTHER PUBLICATIONS

Bian et al., "Towards Low-Loss Monolithic Silicon and Nitride Photonic Building Blocks in State-of-the-Art 300mm CMOS Foundry," Frontiers in Optics/Laser Science, OSA 2020, pp. 1-2.

(Continued)

*Primary Examiner* — Omar R Rojas
(74) *Attorney, Agent, or Firm* — David Cain; Hoffman Warnick LLC

(57) ABSTRACT

Disclosed is a photonic integrated circuit (PIC) structure including: a first waveguide with a first main body and a first end portion, which is tapered; and a second waveguide with a second main body and a second end portion, which has two branch waveguides that are positioned adjacent to opposing sides, respectively, of the first end portion of the first waveguide and that branch out from the second main body, thereby forming a V, U or similar shape. The arrangement of the two branch waveguides of the second end portion of the second waveguide relative to the tapered first end portion of the first waveguide allows for mode matching conditions to be met at multiple locations at the interface between the waveguides, thereby creating multiple signal paths between the waveguides and effectively reducing the light signal power density along any one path to prevent or at least minimize any power-induced damage.

15 Claims, 12 Drawing Sheets

(51) Int. Cl.
*G02B 6/12* (2006.01)
*G02B 6/136* (2006.01)

(56) References Cited

U.S. PATENT DOCUMENTS

| | | | |
|---|---|---|---|
| 5,706,373 | A | 1/1998 | Mueller et al. |
| 6,631,225 | B2* | 10/2003 | Lee ............... B82Y 20/00 |
| | | | 385/28 |
| 6,950,581 | B2 | 9/2005 | Bandyopadhyay |
| 9,500,807 | B2* | 11/2016 | Oka ................... G02B 6/14 |
| 10,429,582 | B1 | 10/2019 | Bian et al. |
| 10,746,921 | B2 | 8/2020 | Bian et al. |
| 11,493,686 | B2 | 11/2022 | Bian |
| 11,513,286 | B2 | 11/2022 | Bian |
| 11,531,164 | B2 | 12/2022 | Dezfulian et al. |
| 11,555,963 | B1 | 1/2023 | Krishnamurthy et al. |
| 2003/0007766 | A1 | 1/2003 | Galarza et al. |
| 2012/0230635 | A1 | 9/2012 | Yoshida |
| 2012/0288229 | A1 | 11/2012 | Doerr et al. |
| 2013/0170807 | A1 | 7/2013 | Hatori et al. |
| 2014/0233881 | A1 | 8/2014 | Hatori et al. |
| 2014/0294341 | A1 | 10/2014 | Hatori et al. |
| 2015/0247974 | A1 | 9/2015 | Painchaud et al. |
| 2016/0103279 | A1 | 4/2016 | Budd |
| 2018/0017732 | A1* | 1/2018 | Tassaert ........... G02B 6/12004 |
| 2018/0059329 | A1* | 3/2018 | Boutami ........... G02B 6/1228 |
| 2019/0086611 | A1 | 3/2019 | Daniel |
| 2020/0012045 | A1 | 1/2020 | Bian et al. |
| 2021/0215882 | A1* | 7/2021 | Khan ................... G02B 6/4239 |

OTHER PUBLICATIONS

Bian et al., "Monolithically Integrated Silicon Nitride Platform," OSA 2021, pp. 1-3.

Giewont et al., "300-mm Monolithic Silicon Photonics Foundry Technology," IEEE Journal of Selected Topics in Quantum Electronics, vol. 25, No. 5, 2019, pp. 1-12.

Rakowski et al., "45nm CMOS—Silicon Photonics Monolithic Technology (45CLO) for Next-Generation, Low Power and High Speed Optical Interconnects," OSA 2020, pp. 1-3.

Sacher et al., "Monolithically Integrated Multilayer Silicon Nitride-on-Silicon Waveguide Platforms for 3-D Photonic Circuits and Devices," Proceedings of the IEEE, vol. 106, No. 12, 2018, pp. 2232-2245.

Sakai et al., "Low Loss Ultra-Small Branches in a Silicon Photonics Wire Waveguide," IEICE Trans. Electron, vol. E85-C, No. 4, 2002, pp. 1033-1038.

Shang et al., Low-Loss Compact Multilayer Silicon Nitride Platform for 3D Photonic Integrated Circuits, OSA 2015, pp. 1-9.

Sodagar et al., "High-Efficiency and Wideband Interlayer Grating Couplers in Multilayer Si/SiO2/SiN Platform for 3D Integration of Optical Functionalities," OSA 2014, pp. 1-11.

Cai et al., "Analysis of the Coupling Characteristics of a Tapered Three-Guide Coupled System," Journal of Lightwave Technology, vol. 8, No. 10, 1990, pp. 1621-1629.

Maegami et al., "Completely CMOS compatible SiN-Waveguide-Based Fiber Coupling Structure for Si Wire Waveguides," Optics Express 16856, vol. 24, No. 15, 2016, pp. 1-10.

Mu et al., "Edge Couplers in Silicon Photonic Integrated Circuits: A Review," Applied Sciences, 2020, 10, 1538, pp. 1-29.

Zhu et al., "Very High Efficiency Optical Coupler for Silicon Nanophotonic Waveguide and Single Mode Optical Fiber," Optics Express 18462, vol. 25, No. 15, 2017, pp. 1-12.

U.S. Appl. No. 17/411,106, Office Action dated Sep. 22, 2022, 15 pages.

U.S. Appl. No. 17/411,106, Final Office Action dated Jan. 20, 2023, 6 pages.

U.S. Appl. No. 17/411,106, Office Action dated Mar. 16, 2023, 10 pages.

* cited by examiner

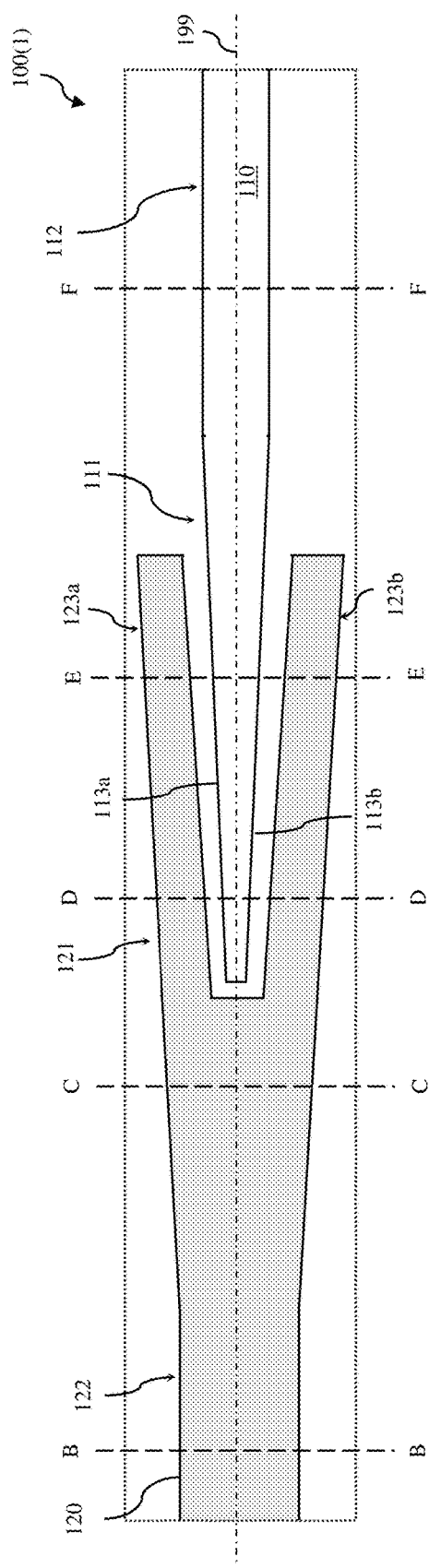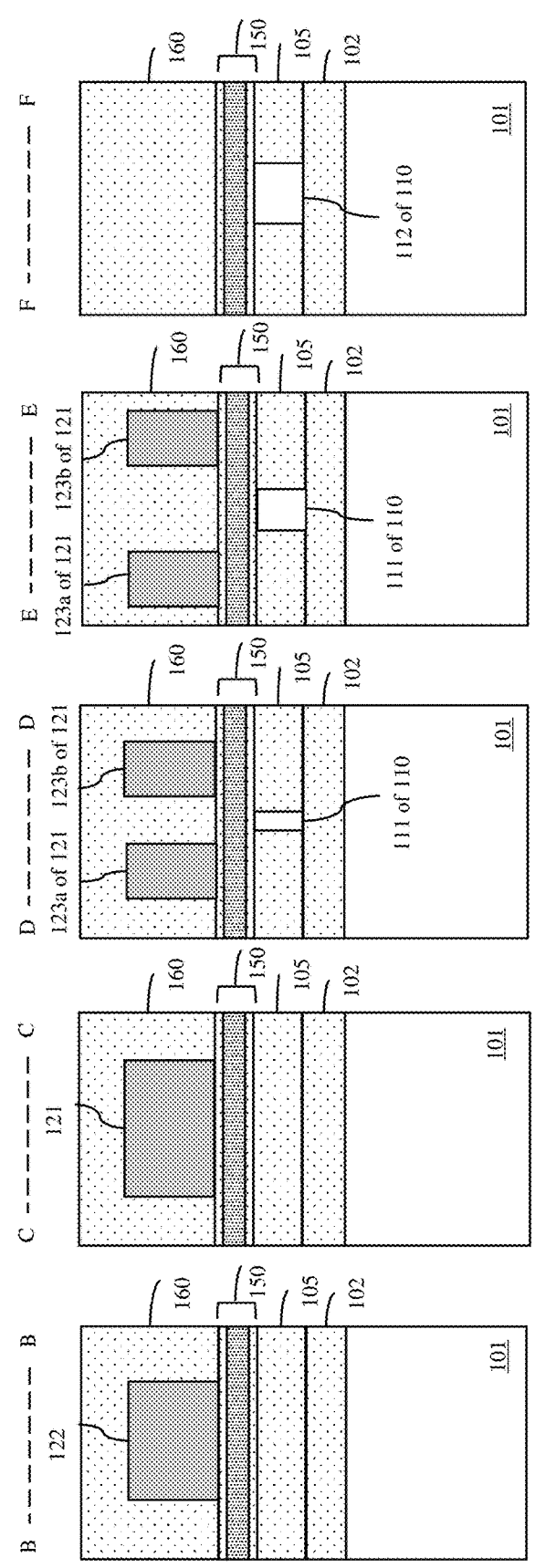
FIG. 1A
FIG. 1B  FIG. 1C  FIG. 1D  FIG. 1E  FIG. 1F

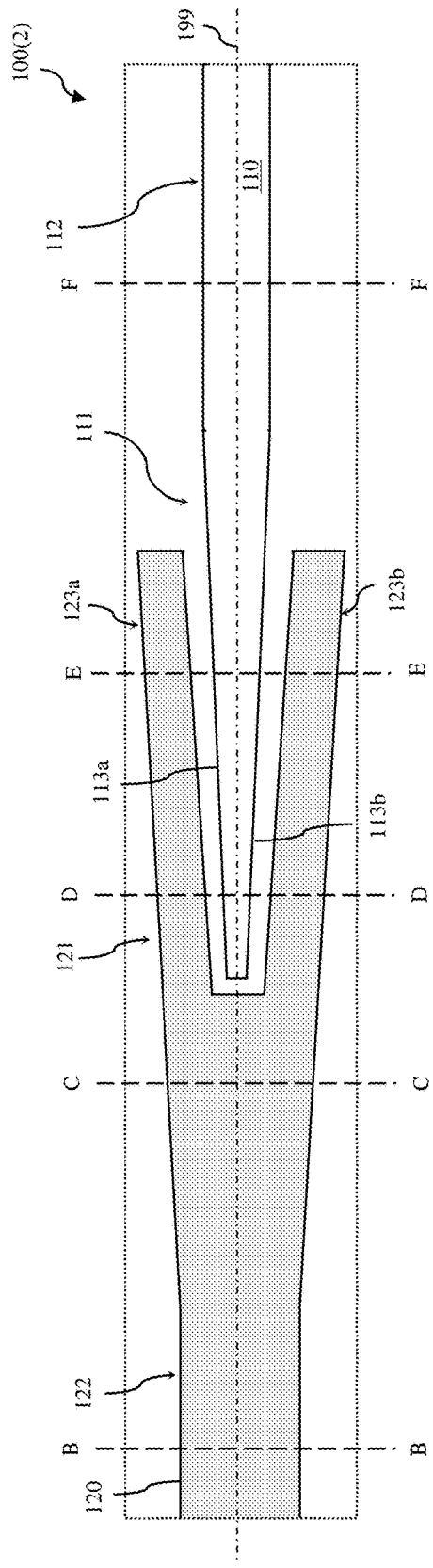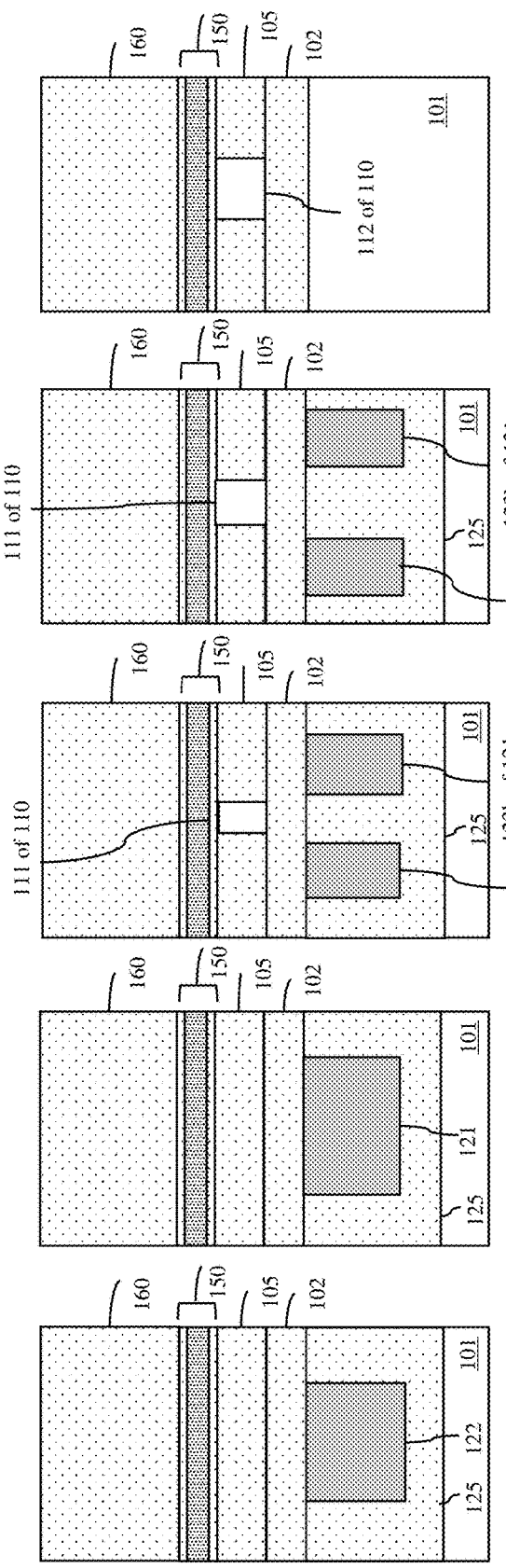

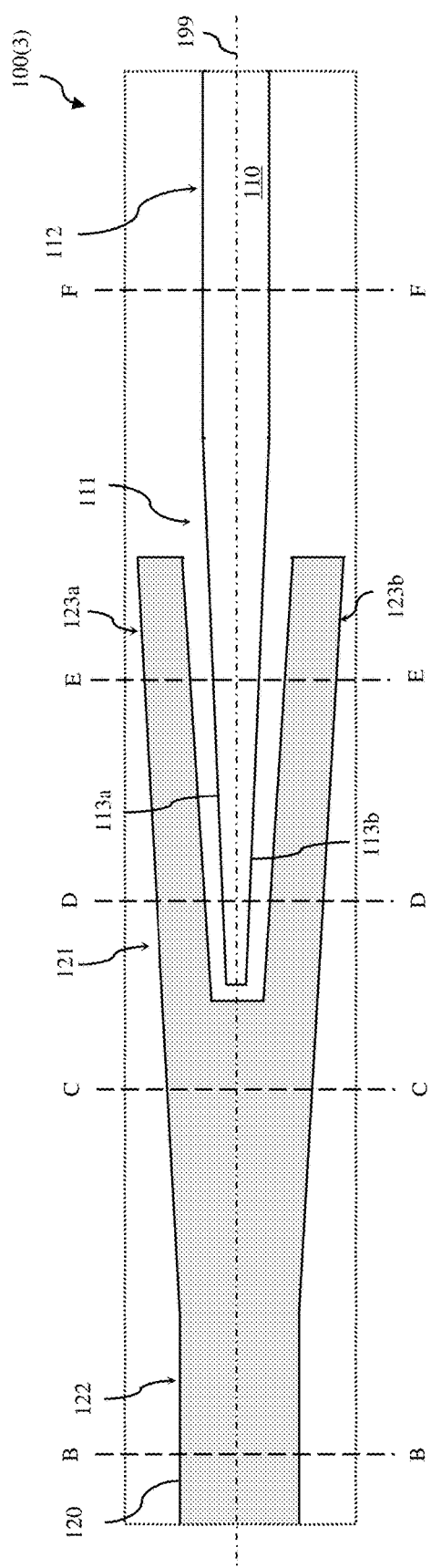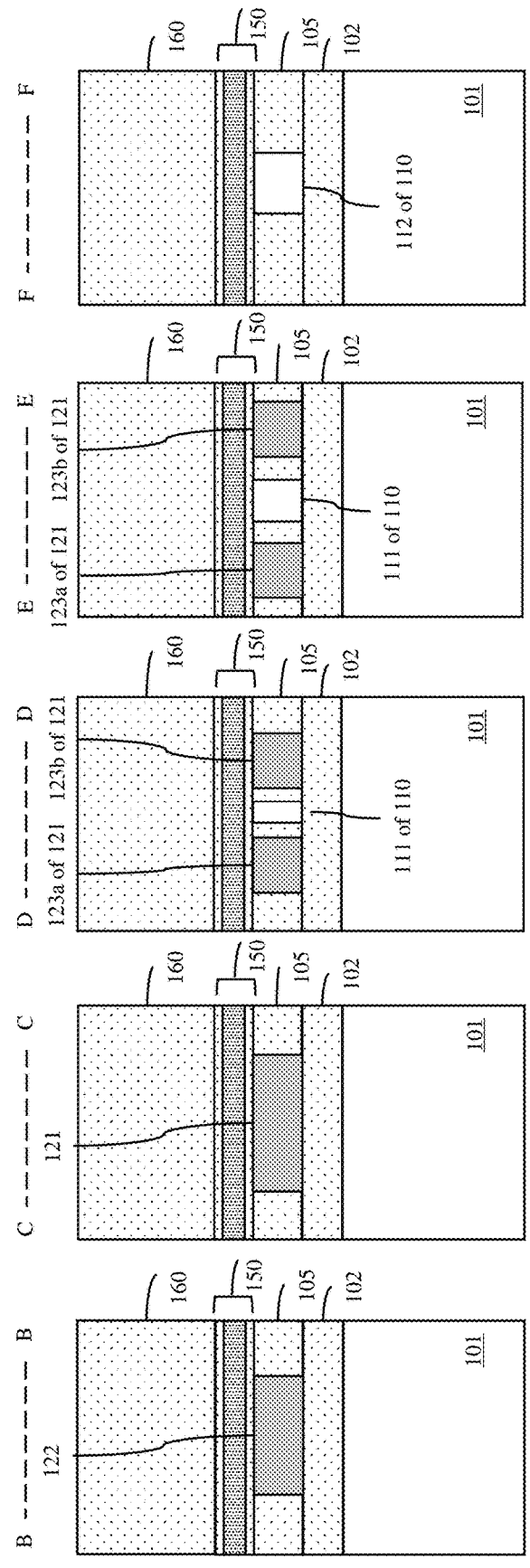
FIG. 3A
FIG. 3B
FIG. 3C
FIG. 3D
FIG. 3E
FIG. 3F

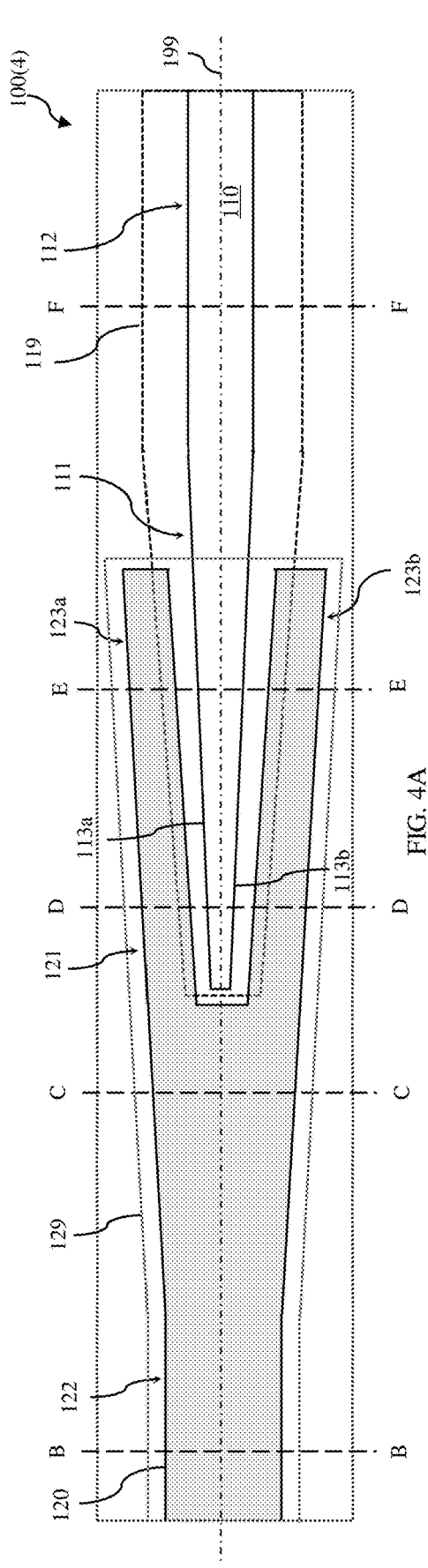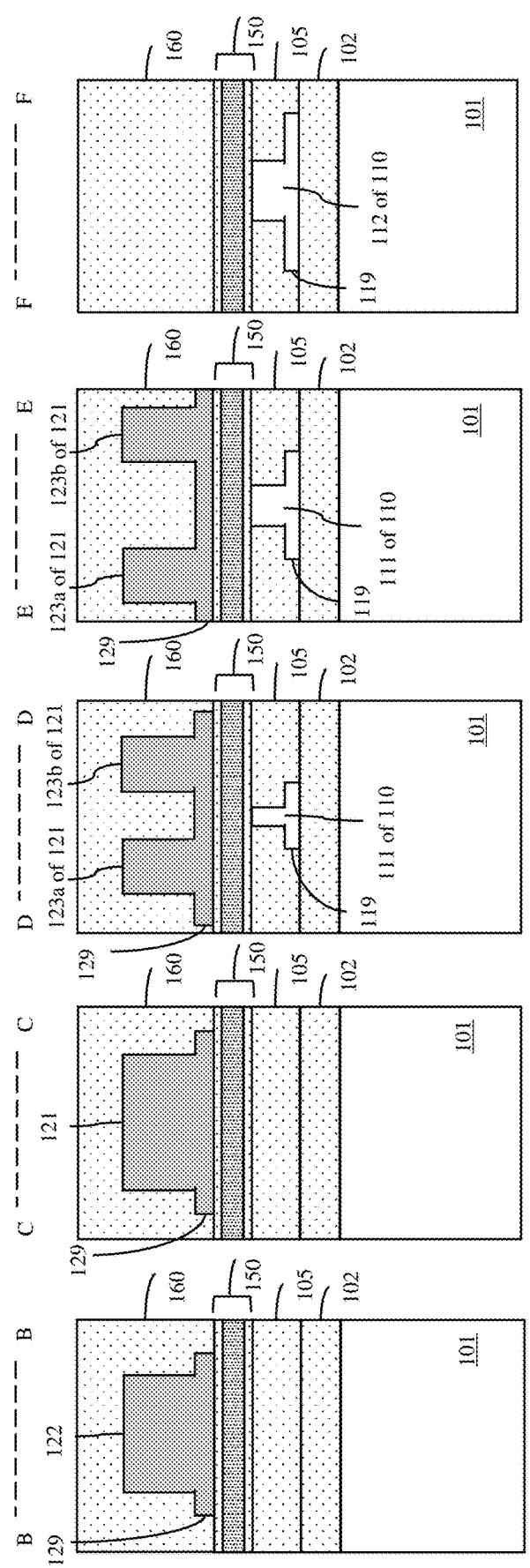
FIG. 4A
FIG. 4B
FIG. 4C
FIG. 4D
FIG. 4E
FIG. 4F

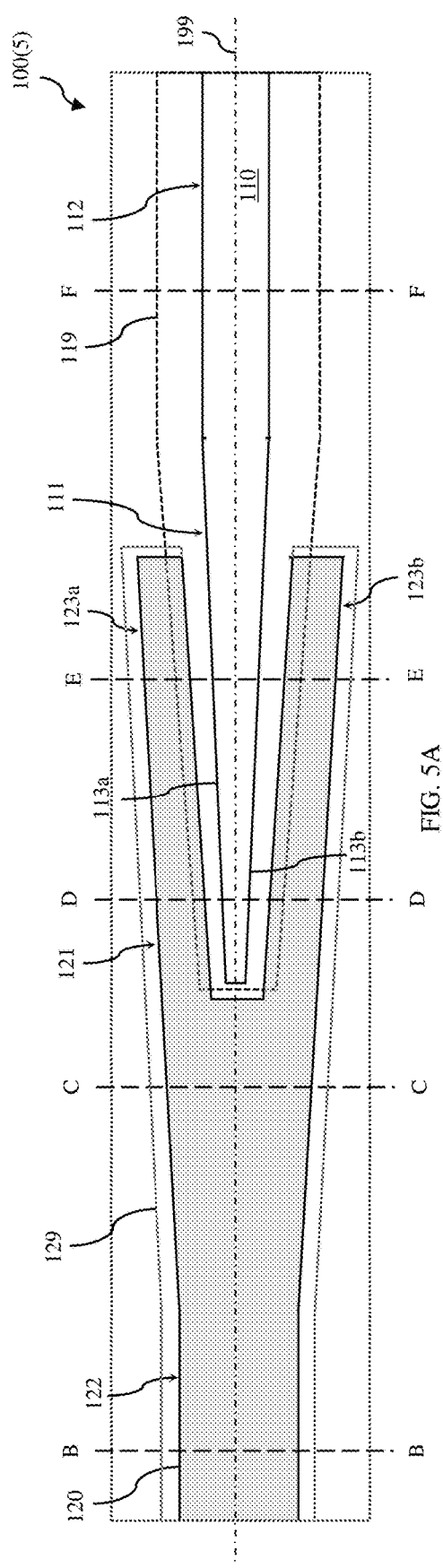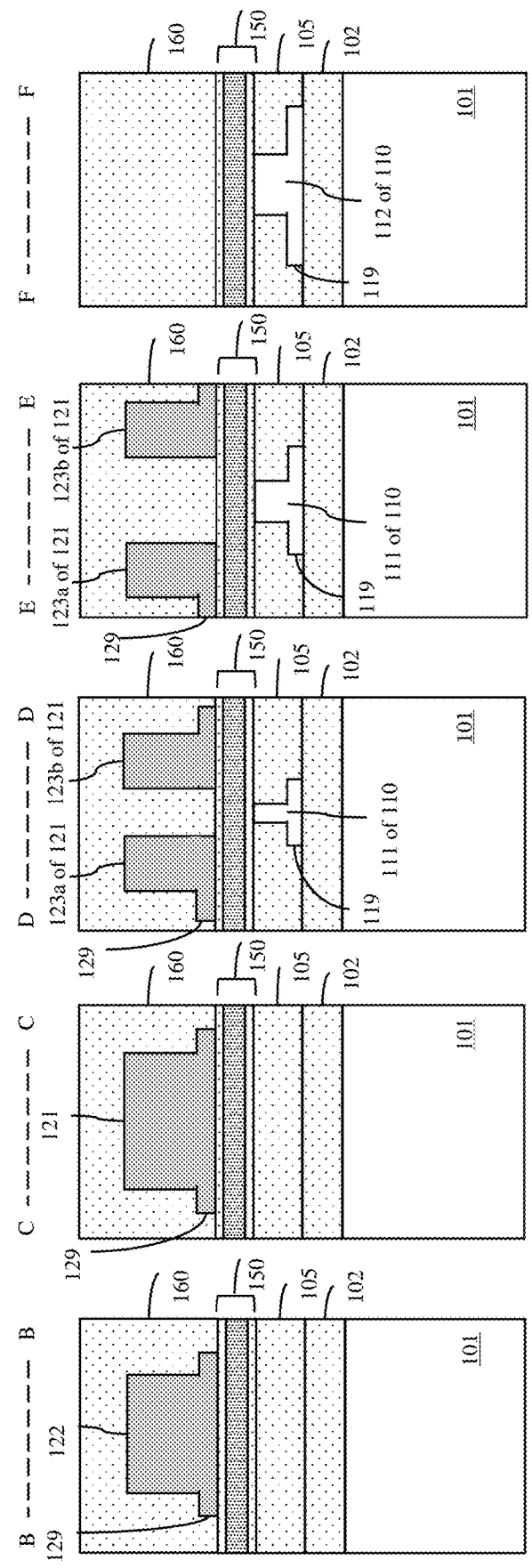

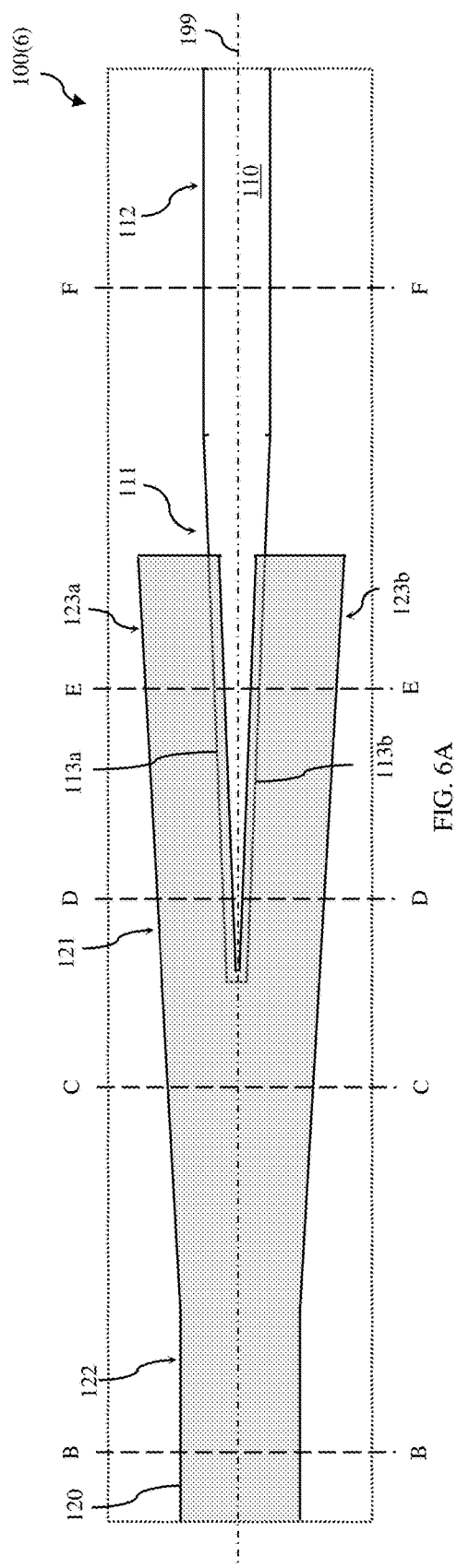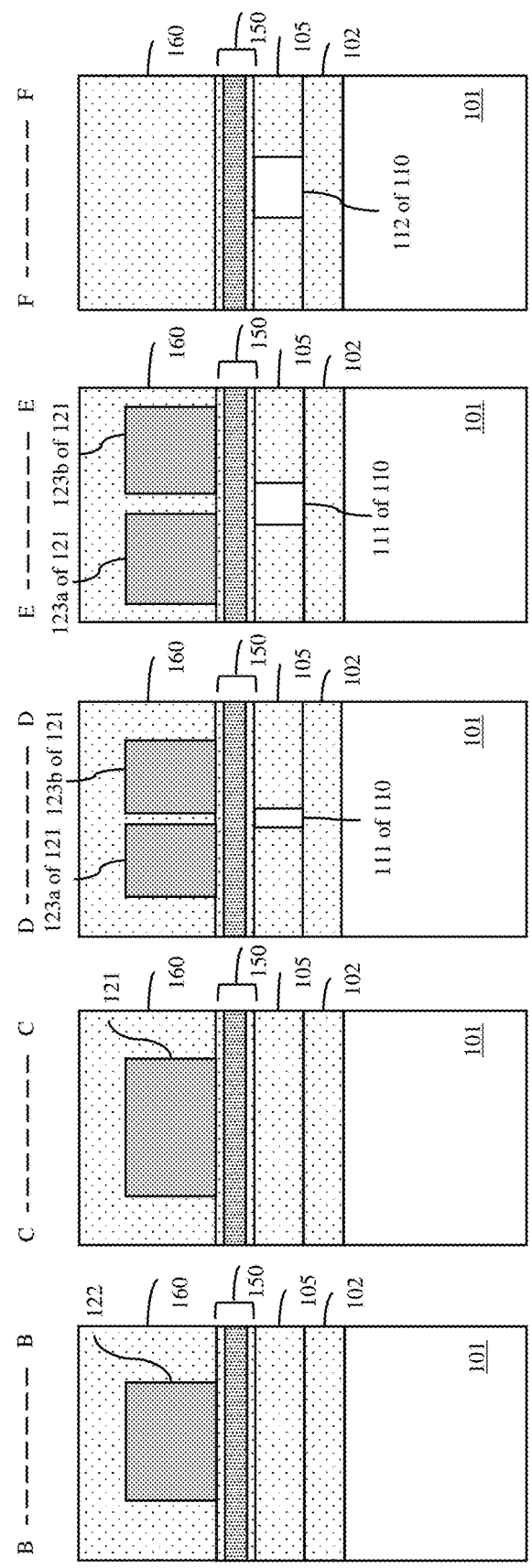

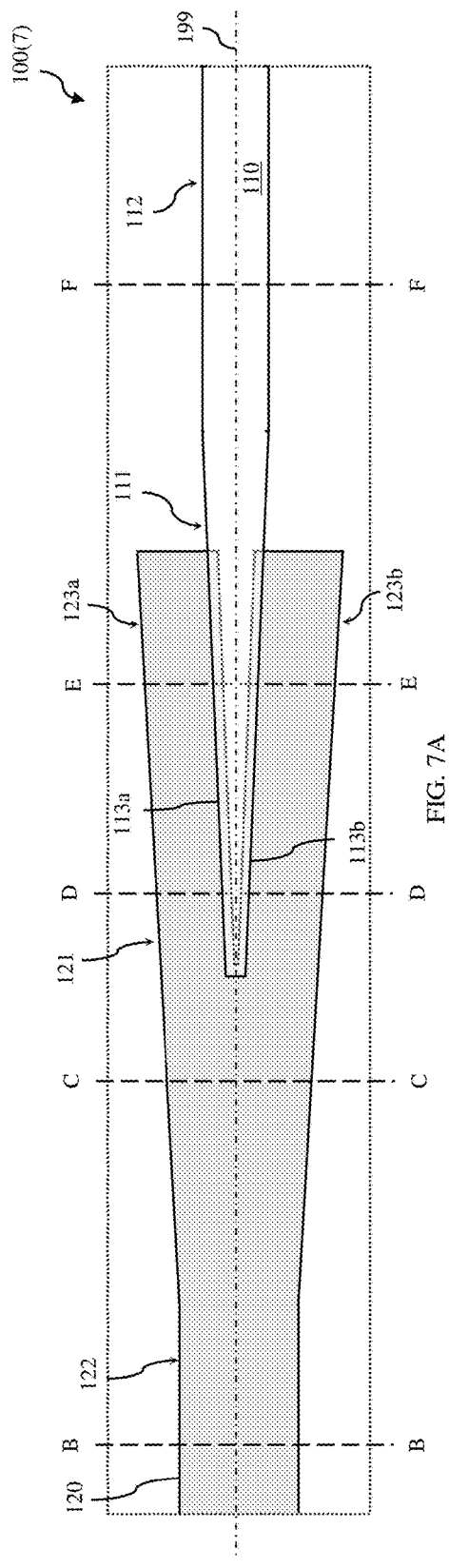
FIG. 7A
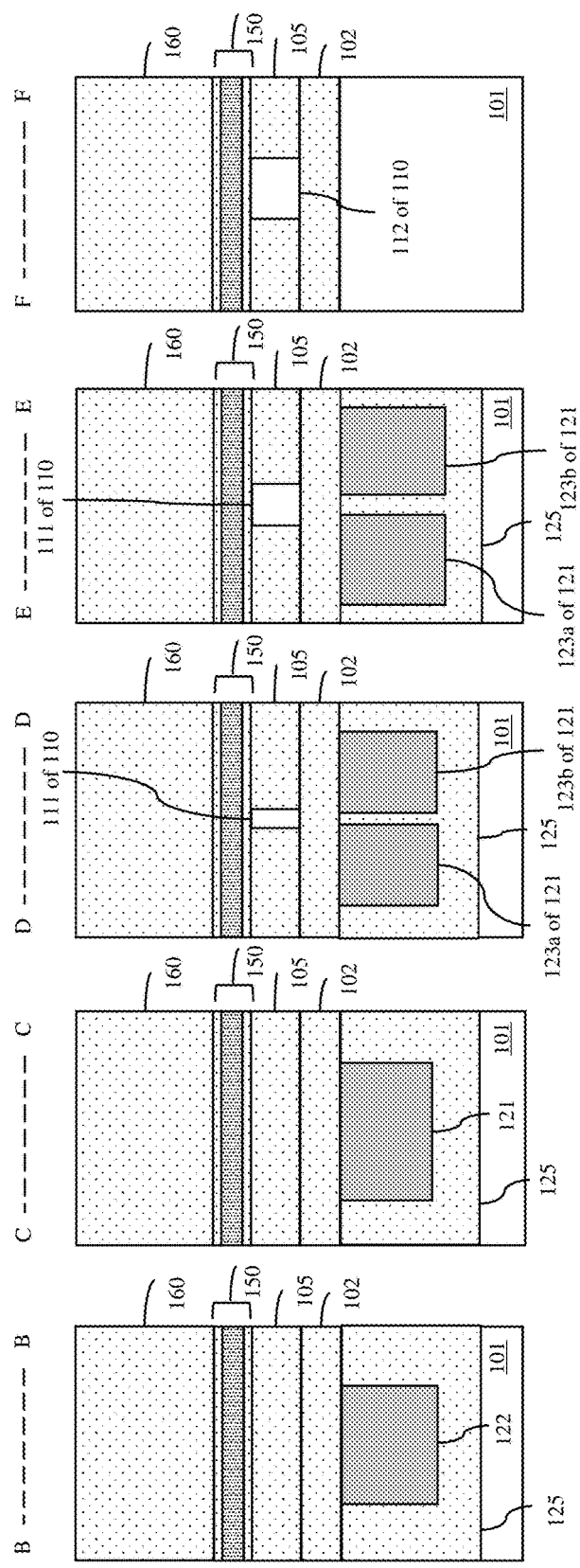
FIG. 7B
FIG. 7C
FIG. 7D
FIG. 7E
FIG. 7F

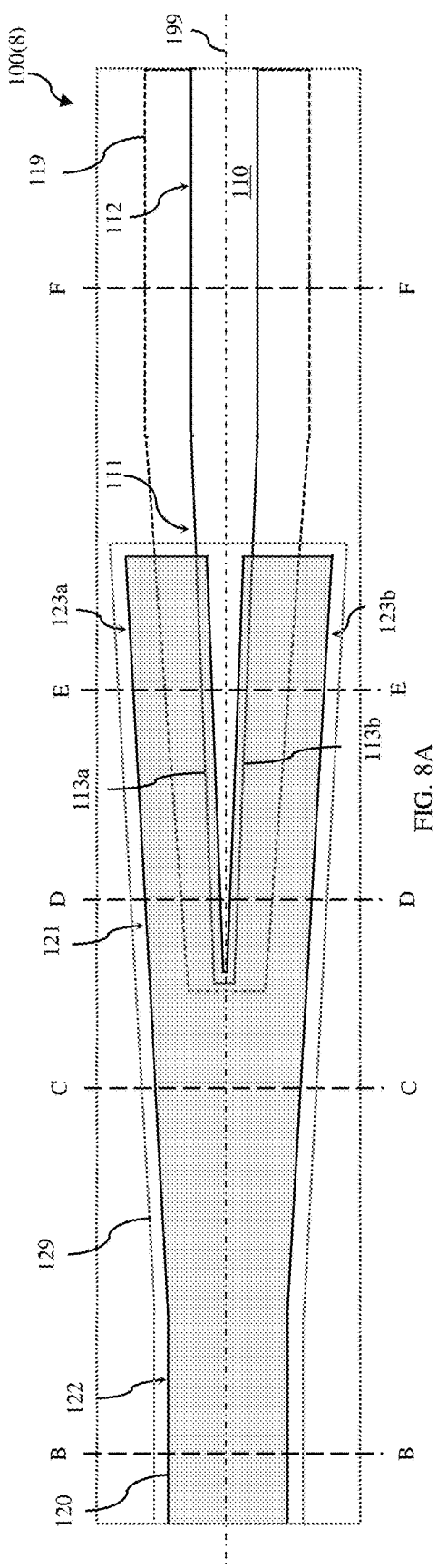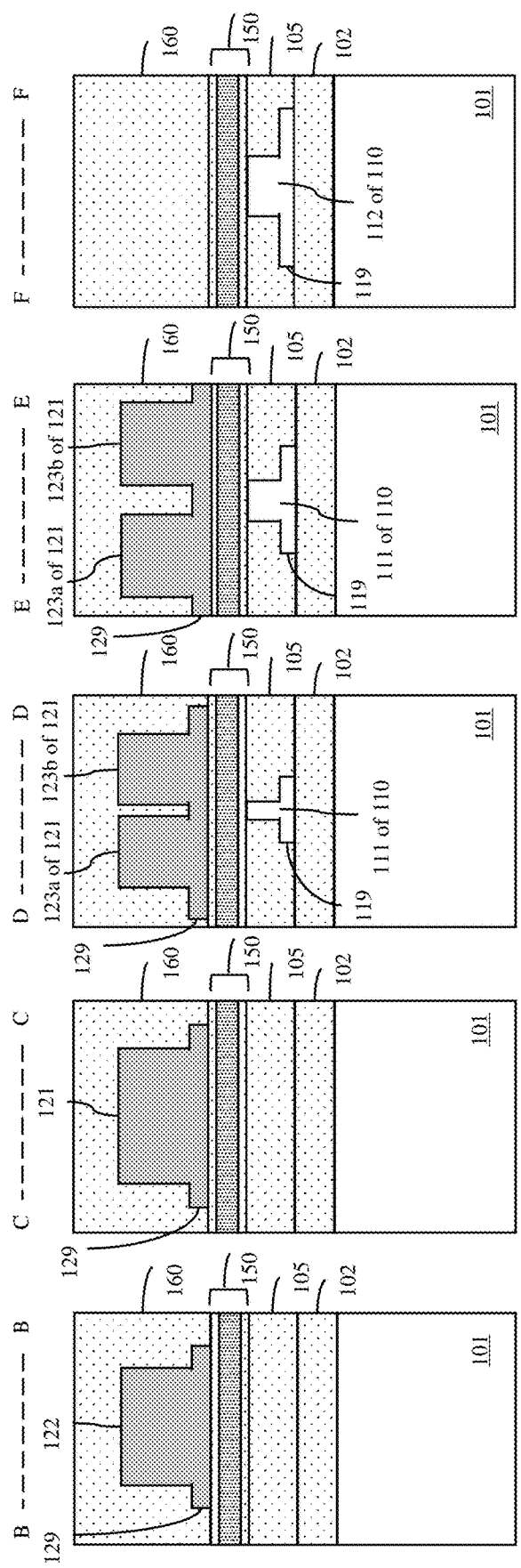

PHOTONIC INTEGRATED CIRCUIT STRUCTURE WITH A TAPERED END PORTION OF ONE WAVEGUIDE ADJACENT TO A V-SHAPED END PORTION OF A DIFFERENT WAVEGUIDE

BACKGROUND

Field of the Invention

The present invention relates to photonic integrated circuit (PIC) structures and, more particularly, to embodiments of a PIC structure where adjacent end portions of different waveguides are configured differently for robustness during transmission of high power optical signals.

Description of Related Art

In photonic integrated circuit (PIC) structures, waveguides can be configured so that optical signals can pass between the waveguides. For example, a tapered end portion of one waveguide can overlay a uniform or tapered end portion of another waveguide and sufficiently close thereto so that optical signals can pass between the two waveguides around a location, along the adjacent end portions, where mode matching occurs (i.e., where the propagation constant of optical mode inside the two waveguides becomes the same). Those skilled in the art will recognize that optical mode of light is generally determined by refractive index profile of the waveguide and its cross-sectional geometric size and shape and, for waveguides with core materials having the same refractive index profiles, mode matching between two waveguides generally occurs at a location where the cross-sectional areas of the two end portions of the two waveguides are approximately the same. For waveguides with core materials having different refractive index profiles, mode matching may still occur at a location where the two end portions may have different cross-sectional areas but the same propagation constant which is determined by the respective combinations of refractive index and cross-sectional area. On the other hand, an optical waveguide of certain material type, geometric size, etc. may have a certain threshold of power level that it can accommodate and power transmission fails have been noted when optical signals are at relatively high optical power levels (i.e., above the threshold).

SUMMARY

Generally, disclosed herein are embodiments of a photonic integrated circuit (PIC) structure. The PIC structure can include a first waveguide and a second waveguide. The first waveguide can have a first main body and a first end portion adjacent to the first main body. The first end portion can be tapered. The second waveguide can have a second main body and a second end portion adjacent to the second main body. The second end portion can have two branch waveguides that are positioned adjacent to opposing sides, respectively, of the first end portion of the first waveguide and that branch out from the second main body so that they form a V, U or similar shape at one end of the second main body.

Some PIC structure embodiments disclosed herein can specifically include a substrate and a first cladding material layer on a substrate. A first waveguide can be on the first cladding material layer. The first waveguide can have a first main body and a first end portion adjacent to the first main body. The first end portion can be tapered. A second cladding material layer can laterally surround the first waveguide and at least one additional cladding material layer can be on the second cladding material layer and the first waveguide. The second waveguide can be on the additional cladding material layer and can have a second main body and a second end portion adjacent to the second main body. The second end portion can have two branch waveguides that are positioned adjacent to opposing sides, respectively, of the first end portion of the first waveguide and that branch out from the second main body so that they form a V, U or similar shape at one end of the second main body. It should be noted that in different PIC structure embodiments disclosed herein, the first waveguide can be above, below or at the same height as the second waveguide, as measured from a bottom surface of a substrate.

Some PIC structure embodiments disclosed herein specifically include at least one waveguide on a slab portion of a corresponding core material layer (i.e., at least one rib waveguide). For example, some PIC structure embodiments disclosed herein can include a substrate and a first cladding material layer on the substrate. A first core material layer can be on the first cladding material layer and can include a first slab portion and a first waveguide on the first slab portion such that the first waveguide is considered a rib waveguide. The first waveguide can have a first main body and a first end portion adjacent to the first main body. The first end portion can be tapered. A second cladding material layer can laterally surround the first waveguide and cover the first slab portion and at least one additional cladding material layer can be on the second cladding material layer and the first waveguide. A second core material layer can be on the at least one additional cladding material layer and can include a second slab portion and a second waveguide on the second slab portion such that the second waveguide is also considered a rib waveguide. The second waveguide can have a second main body and a second end portion adjacent to the second main body. The second end portion can have two branch waveguides that are positioned adjacent to opposing sides, respectively, of the first end portion of the first waveguide and that branch out from the second main body so that they form a V, U or similar shape at one end of the second main body.

It should be noted that in each of the PIC structure embodiments (regardless of whether the first waveguide is at a different height than the second waveguide or at the same height as the second waveguide), the first end portion of the first waveguide can be essentially center aligned with the space between the two branch waveguides of the second end portion. That is, a center axis along the length of the first end portion and a center axis that bisects an angle created at the junction between the two branch waveguides of the second end portion can be in essentially the same vertical plane.

BRIEF DESCRIPTION OF THE SEVERAL VIEWS OF THE DRAWINGS

The present invention will be better understood from the following detailed description with reference to the drawings, which are not necessarily drawn to scale and in which:

FIG. 1A is a layout diagram and FIGS. 1B-1F are different cross-section diagrams illustrating a disclosed embodiment of a photonic integrated circuit (PIC) structure;

FIG. 2A is a layout diagram and FIGS. 2B-2F are different cross-section diagrams illustrating another disclosed embodiment of a PIC structure;

FIG. 3A is a layout diagram and FIGS. 3B-3F are different cross-section diagrams illustrating another disclosed embodiment of a PIC structure;

FIG. 4A is a layout diagram and FIGS. 4B-4F are different cross-section diagrams illustrating another disclosed embodiment of a PIC structure;

FIG. 5A is a layout diagram and FIGS. 5B-5F are different cross-section diagrams illustrating another disclosed embodiment of a PIC structure;

FIG. 6A is a layout diagram and FIGS. 6B-6F are different cross-section diagrams illustrating another disclosed embodiment of a PIC structure;

FIG. 7A is a layout diagram and FIGS. 7B-7F are different cross-section diagrams illustrating another disclosed embodiment of a PIC structure;

FIG. 8A is a layout diagram and FIGS. 8B-8F are different cross-section diagrams illustrating another disclosed embodiment of a PIC structure;

DETAILED DESCRIPTION

Figure 14:
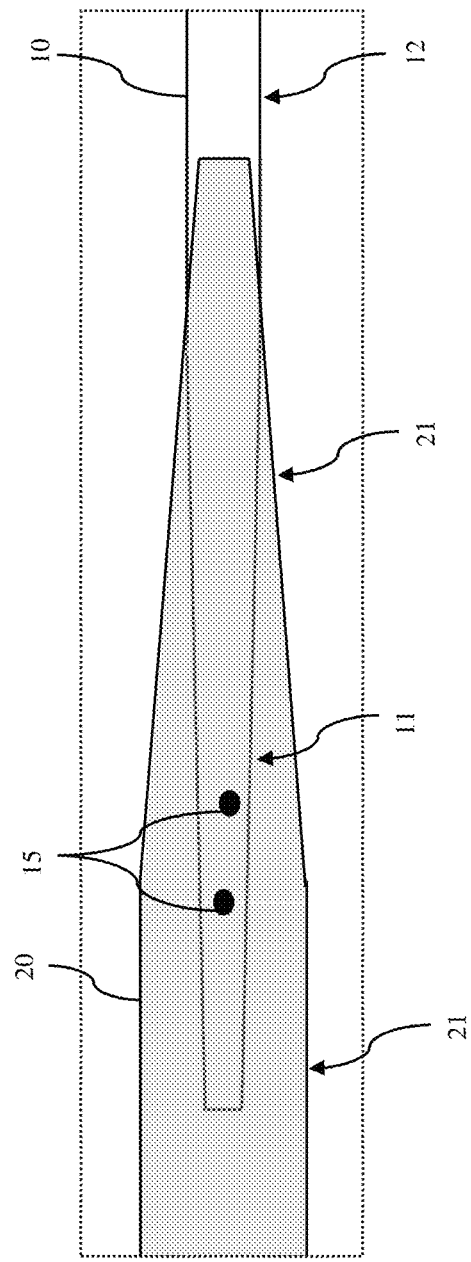
FIG. 14 is a layout diagram illustrating a prior art PIC structure.

FIG. 14 is a layout diagram illustrating an exemplary photonic integrated circuit (PIC) structure including waveguides 10 and 20. In this exemplary PIC structure, waveguide 20 has main body 22 and tapered end portion 21. Waveguide 10 has a main body 12 and a tapered end portion 11. The tapered end portion 21 of the waveguide 20 can overlay and be sufficiently close to the tapered end portion 11 of waveguide 10 such that, where mode matching conditions are met, optical signals can pass between the waveguides 10 and 20 (i.e., the waveguides 10 and 20 can be considered optically coupled). Optical signals can pass between the two waveguides at any location, along those two end portions 11 and 21, where mode matching occurs (i.e., where the propagation constant of optical mode inside the two waveguides becomes the same). Those skilled in the art will recognize that, for waveguides with core materials having the same refractive index profiles, mode matching between waveguides generally occurs at a location where the cross-sectional areas of the two end portions 11 and 21 of the two waveguides 10 and 20, respectively, are approximately the same. For waveguides with core materials having different refractive index profiles (e.g., if the waveguide 20 has a silicon nitride core material and if the waveguide 10 has a silicon core material), mode matching may still occur, particularly, at a location where the two end portions 11 and 12 have different cross-sectional areas but the same propagation constant which is determined by the respective combination of refractive index and cross-sectional area. However, transmission fails have been noted when relatively high power optical signals (i.e., optical signals above a certain threshold power level) pass from a high power tolerant waveguide (e.g., a silicon nitride waveguide, such as the waveguide 20) to a non-high power tolerant waveguide (e.g., a silicon waveguide, such as the waveguide 10). Specifically, when high power optical signals above a certain threshold are transmitted from the silicon nitride waveguide to the silicon waveguide, local areas in the tapered end portion 11 of the silicon waveguide have been found to melt creating defects 15 (referred to herein as power-induced defects). Such power-induced defects 15 can result in transmission fails.

In view of the foregoing, disclosed herein are embodiments of a photonic integrated circuit (PIC) structure where adjacent end portions of different waveguides are configured differently for robustness during transmission of high power optical signals. Specifically, each of the disclosed PIC structure embodiments can include a first waveguide with a first main body and a first end portion adjacent to the first main body. The first end portion can be tapered. Each of the disclosed PIC structure embodiments can also include a second waveguide, which is above, below or at the same level as the first waveguide. The second waveguide can have a second main body and a second end portion adjacent to the second main body. The second end portion can have two branch waveguides, which are positioned adjacent to opposing sides, respectively, of the first end portion of the first waveguide and which branch out from second main body so that they form a V, U or similar shape at one end of the second main body. The arrangement of the two branch waveguides of the second end portion of the second waveguide relative to the first end portion of the first waveguide allows for mode matching conditions to be met at multiple locations at the interface between the first waveguide and the second waveguide, thereby creating multiple signal paths between the first and second waveguides and effectively reducing the light signal power density in any one path to prevent or at least minimize any power-induced damage.

Figure 9A:
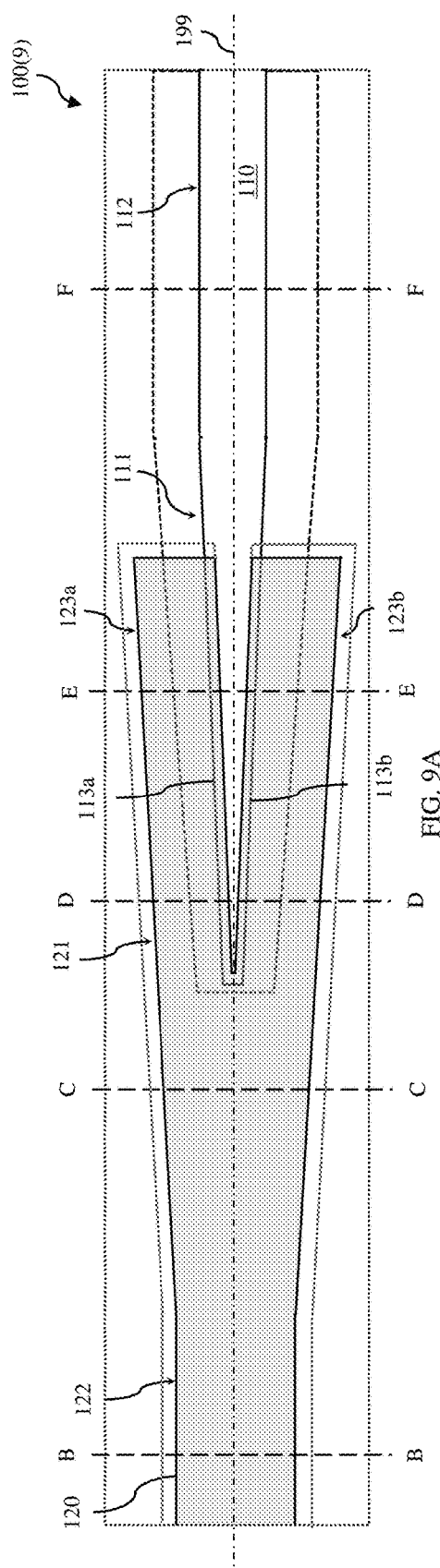
FIG. 9A is a layout diagram and FIGS. 9B-9F are different cross-section diagrams illustrating another disclosed embodiment of a PIC structure.
Figures 9B, 9C, 9D, 9E, 9F:
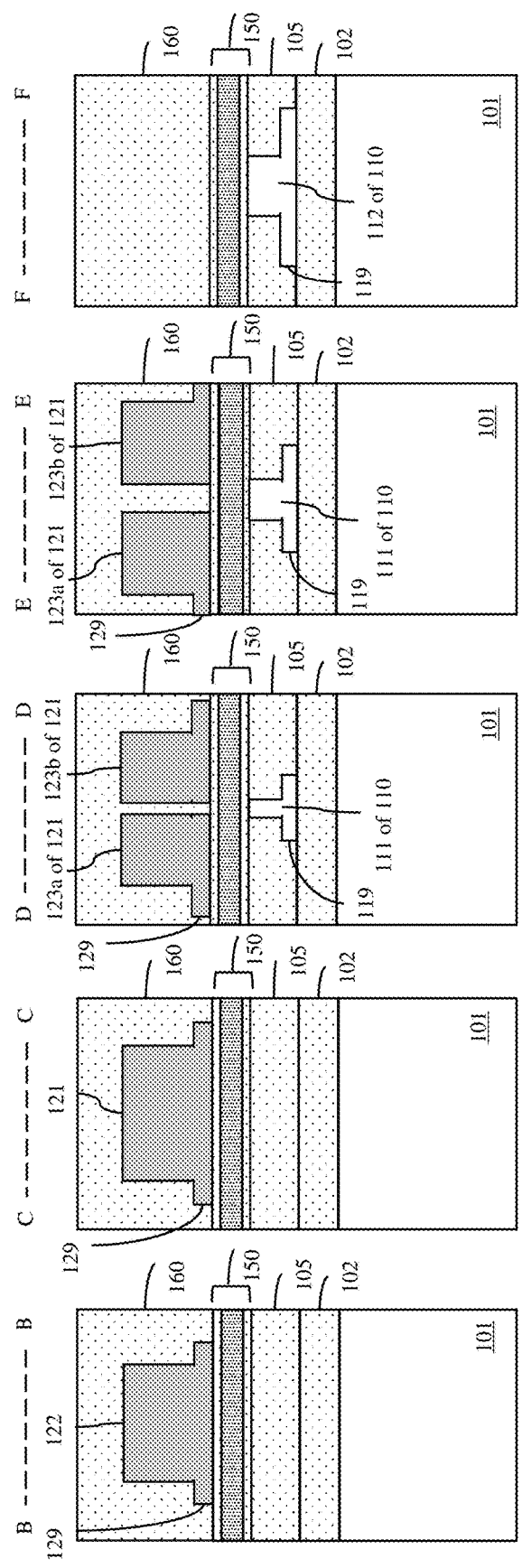
Figure 10:
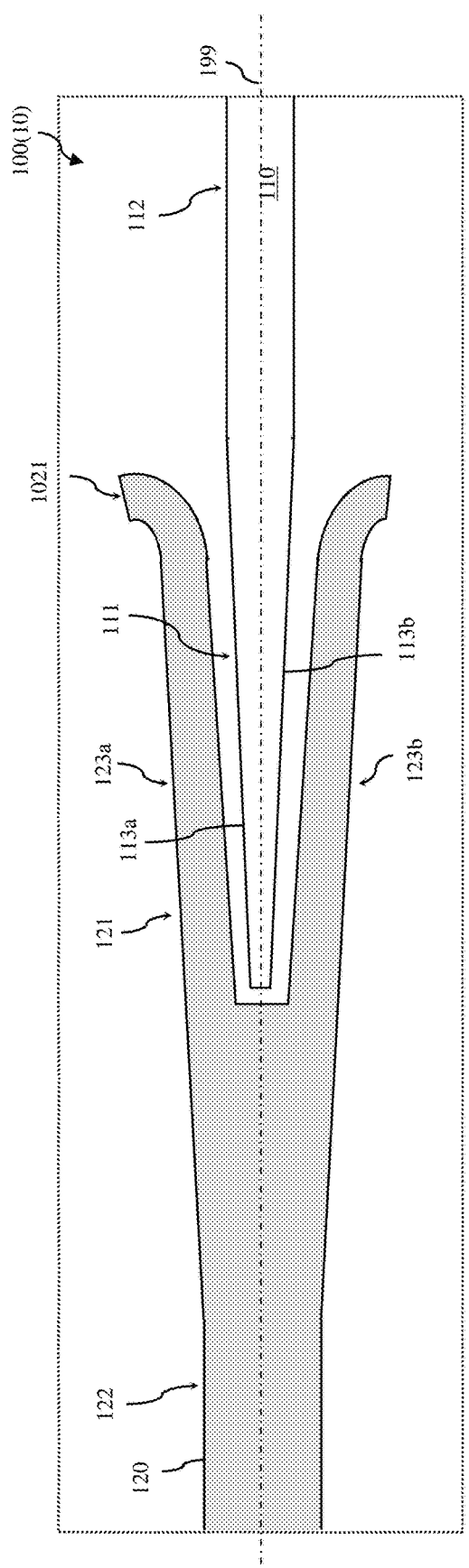
FIGS. 10-13 are different layout diagrams illustrating still other disclosed embodiments, respectively, of a PIC structure.
Figure 11:
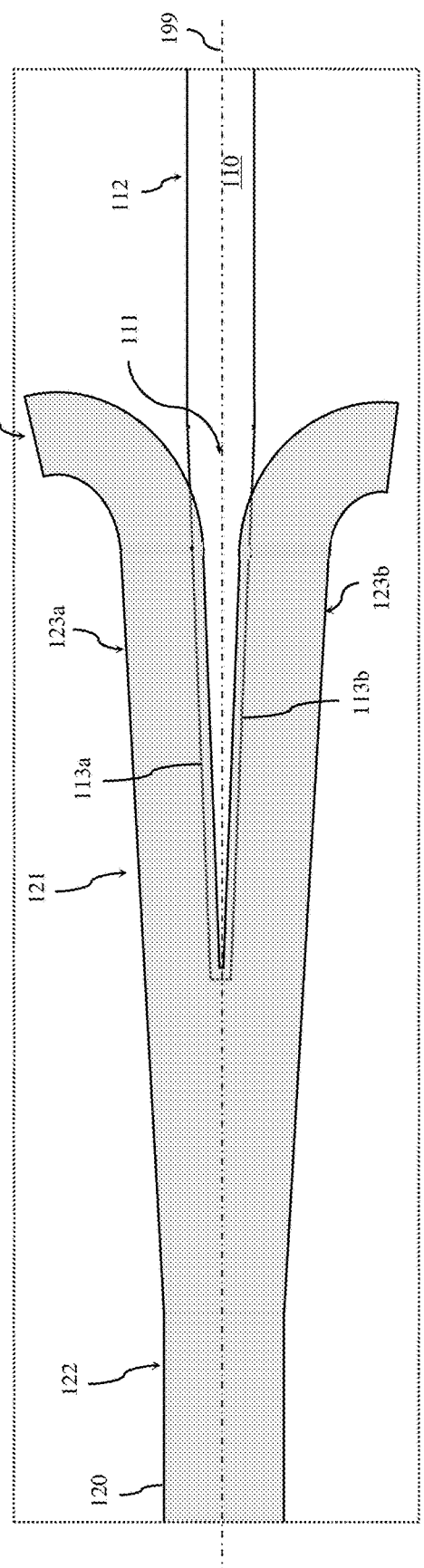
Figure 12:
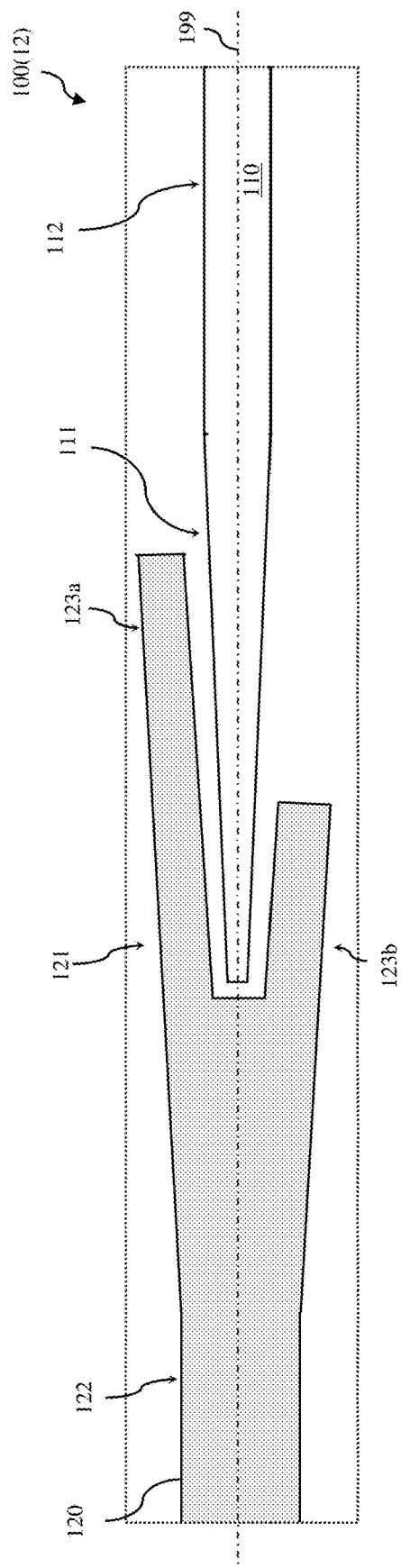
Figure 13:
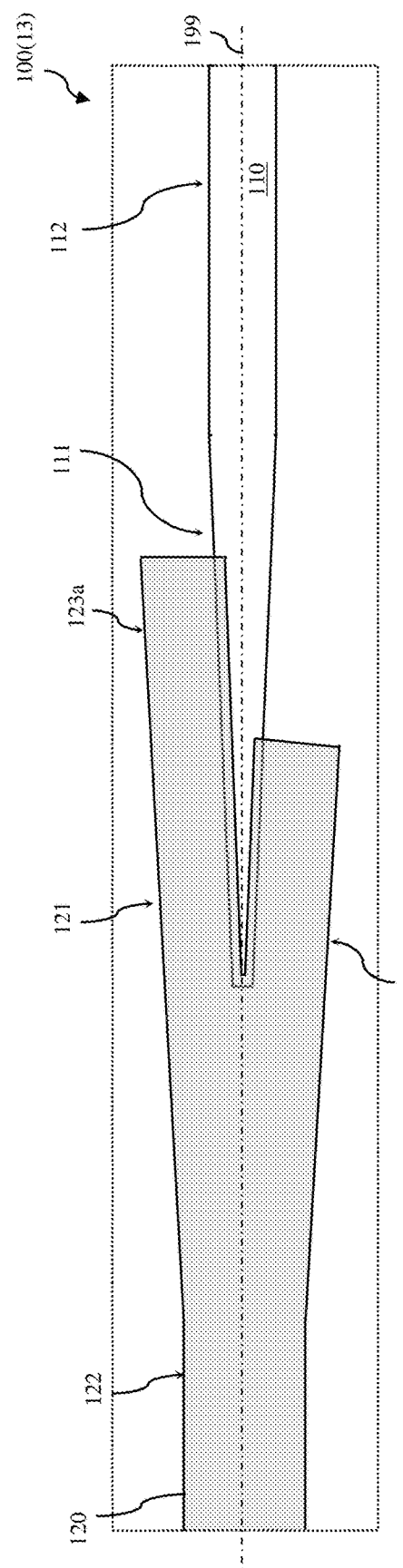

More particularly, disclosed herein are various photonic integrated circuit (PIC) structure embodiments configured to facilitate transmission of high-power optical signals between a first waveguide 110 (e.g., an input waveguide that receives the optical signals or, alternatively, a first input/output waveguide) and a second waveguide 120 (e.g., an output waveguide that transmits the optical signals or, alternatively, a second input/output waveguide) (e.g., see the exemplary PIC structure embodiments 100(1) of FIGS. 1A-1F, 100(2) of FIGS. 2A-2F, 100(3) of FIGS. 3A-3F, 100(4) of FIGS. 4A-4F, 100(5) of FIGS. 5A-5F, 100(6) of FIGS. 6A-6F, 100(7) of FIGS. 7A-7F, 100(8) of FIGS. 8A-8F, 100(9) of FIGS. 9A-9F, 100(10) of FIG. 10, 100(11) of FIG. 11, 100(12) of FIG. 12 and 100(13) of FIG. 13) without resulting in power-induced defects.

Generally, each of the exemplary PIC structure embodiments 100(1)-100(13) can include a substrate 101. The substrate 101 can be, for example, a semiconductor substrate, such as a silicon substrate. Optionally, the PIC structure embodiments 100(1)-100(13) can further include an insulator layer 102 on the substrate 101. The insulator layer 102 can be, for example, a silicon dioxide layer (also referred to herein as a buried oxide (BOX) layer).

Each of the exemplary PIC structure embodiments 100(1)-100(13) can include a first waveguide 110, such as an input waveguide or a first input/output waveguide, with a first main body 112. For purposes of illustration, only a linear portion of the first main body 112 is shown. However, it should be understood that the figures are not intended to be limiting. The first main body 112 of the first waveguide 110 can be linear, can be curved, or can have any other suitable shape depending upon the required application.

The first waveguide 110 can further include a first end portion 111. The first end portion 111 can be tapered. Specifically, the width of the first end portion 111 can taper down (i.e., decrease) from one width adjacent to the first main body 112 to another width at an end wall of the first end portion 111 farthest from the first main body 112, as illustrated. Generally, for a taper as illustrated, the width of the first end portion 111 near the first main body 111 is wider than the width at the end wall farthest from the first main body 112. It should be understood that the figures are not intended to be limiting. The width of the first end portion 111 can taper down (i.e., decrease) essentially linearly from adjacent the first main body 112 to the end wall of the first end portion 111 farthest from the first main body 112, as illustrated. Alternatively, the width of the first end portion 111 can taper down (i.e., decrease) in a stepped or exponential manner from adjacent the first main body 112 to the end wall of the first end portion 111 farthest from the first main body 112. In any case, the first end portion 111 can be essentially symmetrical relative to a plane 199 that extends vertically through a center axis along the length of the first end portion 111. The first waveguide 110, including the first main body 112 and the first end portion 111, can be made of a first core material. In some embodiments, the first core material can be semiconductor material (e.g., silicon, polysilicon, silicon germanium, or polysilicon germanium) or some other core material that is prone to power-induced defects.

Each of the exemplary PIC structure embodiments 100(1)-100(13) can also include a second waveguide 120, such as an output waveguide or, alternatively, a second input/output waveguide. The second waveguide 120 can have a second main body 122. For purposes of illustration, only a linear portion of the second main body 122 is shown. However, it should be understood that the figures are not intended to be limiting. The second main body 122 of the second waveguide 120 can be linear, can be curved, or can have any other suitable shape depending upon the required application.

The second waveguide 120 can further have a second end portion 121 adjacent to one end of the second main body 122. The second end portion 121 can have two branch waveguides 123a-123b. The two branch waveguides 123a-123b can be angled or curved relative to each other and branch out from the second main body 122 so that they form a V, U or similar shape that opens away from the second main body 122 and so that they are separated by a space containing cladding material, as illustrated. The width of the space between the two branch waveguides can flare up (i.e., increase) from one width at the junction between the two branch waveguides 123a-123b to another width at the distal ends of the two branch waveguides 123a-123b. Generally, for a flare as illustrated, the width of the space near the junction between the branch waveguides is narrower than the width at the ends of the two branch waveguides. The width of the space between the two branch waveguides 123a-123b can flare up (i.e., increase) essentially linearly when the two branch waveguides 123a-123b form a V-shape, as illustrated. Alternatively, the width of the space between the two branch waveguides 123a-123b can flare up (i.e., increase) in an exponential manner when the two branch waveguides 123a-123b form a U-shape. Alternatively, the width of the space between the two branch waveguides 123a-123b can flare up (i.e., increase) in some other manner depending upon the shapes of the two branch waveguides 123a-123b. The two branch waveguides 123a-123b can have essentially uniform widths, as illustrated. Alternatively, the two branch waveguides 123a-123b could be tapered, each having one width adjacent to the junction between the two branch waveguides 123a-123b and another width at the end wall farthest from that junction. Generally, for a tapered branch waveguide, the width of the branch waveguide near the second main body is wider than the width at the end of the branch waveguide farthest from the second main body. Alternatively, the two branch waveguides 123a-123b could have any other suitable shape.

The two branch waveguides 123a-123b of the second end portion 121 of the second waveguide 120 can be adjacent to the opposing sidewalls 113a-113b, respectively, of the first end portion 111 of the first waveguide 110 such that in a top down layout view the first end portion 111 appears between the two branch waveguides 123a-123b of the first end portion 111 and further such that the same plane 199 that extends vertically through the center axis along the length of the first end portion 111 also extends vertically through a center axis along the length of the space between the two branch waveguides 123a-123b essentially bisecting the angle created at the junction between the two branch waveguides 123a and 123b. As discussed in greater detail below, depending upon the embodiment, the first end portion 111 of the first waveguide 110 can be below cladding material in the space between the two branch waveguides 123a-123b of the second end portion 121 of the second waveguide 120 (e.g., as shown in the exemplary PIC structure embodiments 100(1) of FIGS. 1A-1F, 100(4) of FIGS. 4A-4F, 100(5) of FIGS. 5A-5F, 100(6) of FIGS. 6A-6F, 100(8) of FIGS. 8A-8F, 100(9) of FIGS. 9A-9F), above cladding material in the space between the two branch waveguides 123a-123b of the second end portion 121 of the second waveguide 120 (e.g., as shown in the exemplary PIC structure embodiments 100(2) of FIGS. 2A-2F and 100(7) of FIGS. 7A-7F), or embedded within cladding material in the space between the two branch waveguides 123a-123b of the second end portion 121 of the second waveguide 120 (e.g., as shown in the exemplary PIC structure embodiments 100(3) of FIGS. 3A-3F).

It should be noted that the two branch waveguides 123a-123b can be essentially symmetrical about the plane 199. That is, they can be mirror images of each other with essentially the same length, width and shape (e.g., see the exemplary PIC structure embodiments 100(1) of FIGS. 1A-1F, 100(2) of FIGS. 2A-2F, 100(3) of FIGS. 3A-3F, 100(4) of FIGS. 4A-4F, 100(5) of FIGS. 5A-5F, 100(6) of FIGS. 6A-6F, 100(7) of FIGS. 7A-7F, 100(8) of FIGS. 8A-8F, and 100(9) of FIGS. 9A-9F). Alternatively, the two branch waveguides 123a-123b can be asymmetrical. That is, they can have different lengths (e.g., see the exemplary PIC structure embodiments 100(12) of FIG. 12 and 100(13) of FIG. 13), different shapes, different widths, etc. It should be noted that, depending upon the shapes of the two branch waveguides 123a-123b, each sidewall 113a-113b of the first end portion 111 of the first waveguide 110 could be essentially parallel to the adjacent sidewall of the adjacent branch waveguide 123a-123b, respectively, as illustrated, or not parallel thereto. Additionally, it should be noted that distal end portion of each branch 123a-123b can follow the same shape as the rest of that branch (e.g., see the distal end portions of the two branch waveguides 123a-123b in the exemplary PIC structure embodiments 100(1) in FIGS. 1A-1F to 100(9) of FIGS. 9A-9F). Alternatively, the distal end portion of one or both branch waveguides 123a-123b can be curved and, more particularly, curved outward away from the first end portion 111 (e.g., see the curved distal end portions 1021 in the exemplary PIC structure embodiments 100(10) of FIG. 10 and 100(11) of FIG. 11).

In each of the exemplary PIC structure embodiments, the second waveguide 120, including the second main body 122 and the second end portion 121, can be made of a second core material. Optionally, the second core material can be different from the first core material. For example, as mentioned above, in some embodiments of the PIC structure, the first core material of the first waveguide 110 could be a semiconductor material (e.g., silicon, polysilicon, silicon germanium, or polysilicon germanium) or some other core material that is prone to power-induced defects. The second core material of the second waveguide 120 could be silicon nitride, aluminum nitride, or some other second core material that is different from the first core material. In any case, it should be understood that the first core material of the first waveguide 110 and the second core material of the second waveguide 120 will be surrounded on all sides (e.g., top, bottom, and any sidewalls) by suitable cladding material to facilitate propagation of optical signals therethrough. Specifically, those skilled in the art will recognize that, to facilitate optical signal propagation through an optical waveguide, the waveguide material (also referred to as the core material) should have a first refractive index and should be surrounded by cladding material that has a second refractive index that is smaller than the first refractive index. For example, silicon can have a refractive index that can vary from approximately 3.3 to approximately 3.6 as a function of variations in temperature and wavelength. Thus, for example, if the core material of a given waveguide is silicon, then suitable cladding material could be silicon dioxide with a refractive index smaller than 1.6, silicon nitride with a refractive index smaller than 2.1, or any other suitable insulator material with a refractive index that is smaller than the lowest refractive index of silicon. Also, for example, if the core material of a given waveguide is silicon nitride with a refractive index of approximately 2.0 or aluminum nitride with a refractive index of approximately 2.16, then suitable cladding material could be silicon dioxide with a refractive index smaller than 1.6 or any other suitable insulator material with a refractive index that is smaller than the lowest refractive index of silicon. In the exemplary PIC structure embodiments 100(1)-100(13), appropriate cladding material should be above and below the first waveguide and second waveguide and also positioned laterally adjacent to any sidewalls of those waveguides. Thus, the space between the two branch waveguides 123a-123b of the split flared second end portion 121 of the second waveguide 120 should be filled with or at least contain cladding material.

In any case, in some of the exemplary PIC structure embodiments, the first waveguide 110 and the second waveguide 120 can be at different heights relative to the bottom surface of the substrate 101. For example, the first waveguide 110 can be on the substrate 101 at a first height, as measured from the bottom surface of the substrate, and the second waveguide 120 can be on the substrate at a second height, as measured from the bottom surface of the substrate. In some of the exemplary PIC structure embodiments, the first height of the first waveguide can be lower than the second height of the second waveguide 120 such that the first waveguide 110 is between the substrate 101 and the second waveguide 120 (e.g., as shown in the exemplary PIC structure embodiments 100(1) of FIGS. 1A-1F, 100(4) of FIGS. 4A-4F, 100(5) of FIGS. 5A-5F, 100(6) of FIGS. 6A-6F, 100(8) of FIGS. 8A-8F, 100(9) of FIGS. 9A-9F). In some of the exemplary PIC structure embodiments, the first height of the first waveguide 110 can be higher than the second height of the second waveguide 120 (e.g., as shown in the exemplary PIC structure embodiments 100(2) of FIGS. 2A-2F and 100(7) of FIGS. 7A-7F). In those PIC structure embodiments where the first end portion 111 of the first waveguide 110 is either below or above (but not embedded within) the space between the two branch waveguides 123a-123b, the two branch waveguides 123a-123b can be completely offset from the first end portion 111 of the first waveguide 110 (e.g., as shown in the exemplary PIC structure embodiments 100(1) of FIGS. 1A-1F and 100(2) of FIGS. 2A-2F). That is, they do not overlay or underlay the first end portion. Alternatively, they can overlay or underlay (as applicable) the opposing sides 113a-113b, respectively, of the tapered first end portion 111 of the first waveguide 110 (e.g., as shown in the exemplary PIC structure embodiments 100(6) of FIGS. 6A-6F, 100(7) of FIGS. 7A-7F, etc.). In some of the exemplary PIC structure embodiments, the first waveguide 110 and the second waveguide 120 can be at the same height, as measured from the bottom surface of the substrate 101 (e.g., as shown in the exemplary PIC structure embodiment 100(3) of FIGS. 3A-3F).

More specifically, as mentioned above, in some of the PIC structure embodiments, the first waveguide 110 can be at a first height and the second waveguide 120 can be at a second height, which is higher than the first height. In this case, the first end portion 111 of the first waveguide 110 can be aligned below the cladding material-containing space between the two branch waveguides 123a-123b of the second end portion 121 of the second waveguide 120. Furthermore, the two branch waveguides 123a-123b of the second end portion 121 of the second waveguide 120 can be completely offset from the first end portion 111 of the first waveguide 110. That is, no portion of the two branch waveguides 123a-123b of the second end portion 121 of the second waveguide 120 extends over (i.e., overlays) the first end portion 111 of the first waveguide 110 (e.g., see the exemplary PIC structure embodiments 100(1) of FIGS. 1A-1F, 100(4) of FIGS. 4A-4F, 100(5) of FIGS. 5A-5F, 100(10) of FIG. 10, and 100(12) of FIG. 12). Alternatively, the two branch waveguides 123a-123b of second end portion 121 of the second waveguide 120 can partially overlay the first end portion 111 of the first waveguide 110. That is, adjacent edges of the two branch waveguides 123a-123b of the second end portion 121 of the second waveguide extend over the opposing sides 113a-113b, respectively, of the first end portion 111 of the first waveguide 110 (e.g., see the exemplary PIC structure embodiments 100(6) of FIGS. 6A-6F, 100(8) of FIGS. 8A-8F, 100(9) of FIGS. 9A-9F, 100(11) of FIG. 11, and 100(13) of FIG. 13).

Also as mentioned above, in some of the PIC structure embodiments, the first waveguide 110 can be at a first height and the second waveguide 120 can be at a second height, which is lower than the first height. In this case, the first end portion 111 of the first waveguide 110 can be aligned above the cladding-material containing space between the two branch waveguides 123a-123b of the second end portion 121 of the second waveguide 120 and the two branch waveguides 123a-123b of the second end portion 121 of the second waveguide 120 can be completely offset from the first end portion 111 of the first waveguide 110. That is, no portion of the two branch waveguides 123a-123b of the second end portion 121 of the second waveguide 120 extends under (i.e., underlays) the first end portion 111 of the first waveguide 110 (e.g., see the exemplary PIC structure embodiment 100(2) of FIGS. 2A-2F). Alternatively, the two branch waveguides 123a-123b of the second end portion 121 of the second waveguide 120 partially underlay the first end portion 111 of the first waveguide 110. That is, adjacent edges of the two branch waveguides 123a-123b of the second end portion 121 of the second waveguide 120 extend under the opposing sides 113a-113b, respectively, of the first end portion 111 of the first waveguide 110 (e.g., see the exemplary PIC structure embodiment 100(7) of FIGS. 7A-7F).

For purposes of illustration, each of the exemplary PIC structure embodiments 100(1)-100(13) are shown with the first core material of the first waveguide 110 being above and immediately adjacent to the insulator layer 102. The first waveguide 110 can be patterned and etched into the desired shape (as described above) from a first core material layer. The first core material layer can be, for example, a semiconductor layer such as a single crystalline silicon layer (i.e., the first core material can be silicon). Alternatively, the first core material layer could be some other suitable type of semiconductor layer such as a polysilicon layer, a germanium layer, a silicon germanium layer, etc. (i.e., the first core material could, alternatively, be polysilicon, germanium, silicon germanium, etc.). Alternatively, the first core material layer could be a layer of some other suitable waveguide core material. In any case, as discussed above, the materials of the insulator layer 102 and first core material layer should be selected so that the insulator layer 102 can effectively function as cladding material for the first waveguide 110. Thus, the insulator layer 102 is also referred to herein as a first cladding material layer.

It should be noted that, during processing, the shape of the first waveguide 110 can be patterned and etched completely through the first core material layer such that the first waveguide is a discrete shape with sidewalls that extend upward from the top surface of the insulator layer 102 and, thus, such that the first waveguide 110 is considered a ridge waveguide (e.g., see the exemplary PIC structure embodiments 100(1) of FIGS. 1A-1F, 100(2) of FIGS. 2A-2F, 100(3) of FIGS. 3A-3F, 100(6) of FIGS. 6A-6F and 100(7) of FIGS. 7A-7F). Alternatively, during processing, the first waveguide 110 can be patterned and etched into the upper portion only of the first core material layer such that the first waveguide 110 has sidewalls that extend upward from the lower portion of the first core material layer (i.e., a first slab portion 119) and, thus, such that the first waveguide 110 is considered a rib waveguide (e.g., see the exemplary PIC structure embodiments 100(4) of FIGS. 4A-4F, 100(5) of FIGS. 5A-5F, 100(8) of FIGS. 8A-8F and 100(9) of FIGS. 9A-9F). In this case, before or after the shape for the first waveguide 110 is patterned and etched into the upper portion of the first core material layer, the shape of the first slab portion 119 can optionally be patterned and etched. For example, in some embodiments, the first slab portion 119 and the first waveguide 110 can be patterned and etched so that they have essentially the same shape with the first slab portion being larger than the first waveguide such that the entire first waveguide structure extends upward from the first slab portion 119 (as illustrated). In some embodiments, the first core material layer can be patterned and etched so that the first main body of the first waveguide is a rib-type and so that the first end portion is ridge-type (not shown).

As mentioned above, the first waveguide 110 can be surrounded by suitable cladding material to facilitate propagation of optical signals therethrough. Thus, the exemplary PIC structure embodiments 100(1)-100(13) can further include a second cladding material layer 105 on the top surface of the insulator layer 102 laterally surrounding the first waveguide 110 (and covering any first slab portion 119, if applicable). The second cladding material layer 105 can be, for example, another silicon dioxide layer or some other suitable cladding material depending upon the first core material of the first waveguide 110. Top surfaces of the second cladding material layer 105 and the first waveguide 110 can be essentially coplanar.

Additionally, at least one additional cladding material layer 150 can cover the top surfaces of the second cladding material layer 105 and the first waveguide 110. As illustrated, in some embodiments, multiple additional cladding material layers 150 (e.g., two, three, etc.) can be stacked on the top surfaces of the second cladding material layer 105 and the first waveguide 110. The additional cladding material layers 150 can include, for example, a silicon nitride layer sandwiched between two thin silicon dioxide layers. In other embodiments, a relatively thick additional cladding material layer 150 could be on the top surfaces of the second cladding material layer 105 and the first waveguide 110. This relatively thick additional cladding material layer could be, for example, a relatively thick silicon dioxide layer. In still other embodiments, the additional cladding material layer(s) could have different sections with different configurations (e.g., different numbers of layers and materials). For example, one section including a silicon nitride layer between two thin silicon dioxide layers could be on the top surface of the first main body 112 of the first waveguide 110 and could extend laterally onto a portion of the top surface of the second cladding material layer 105 adjacent thereto. Optionally, the silicon nitride layer could be a thin layer (e.g., a slab) patterned with a main body that is wider than the main body of the first waveguide and with a tapered end oriented in (i.e., pointing) in the same direction as the tapered first end portion 111 of the first waveguide 110 without extending over the tapered first end portion 111. Another section including only a relatively thick silicon dioxide layer could be on the top surface of the tapered first end portion 111 of the first waveguide 110 and on portions of the top surface of the second cladding material layer 105 adjacent thereto.

In any case, one or more layers of interlayer dielectric (ILD) material 160 can be on the additional cladding material layer(s) 150. The ILD material 160 can be, for example, a silicon dioxide. For purposes of illustration, the first waveguide 110 is described above and shown in the figures as being patterned from a semiconductor layer immediately adjacent to the top surface of the insulator layer 102. However, it should be understood that the figures and description are not intended to be limiting. Although not shown, alternatively, the first waveguide 110 could be patterned from some other type of core material layer, which is immediately adjacent to the top surface of the insulator layer 102 or which is at some distance above or below the top surface of the insulator layer.

As mentioned above, the second waveguide 120 can optionally be at a different height than the first waveguide 110. Furthermore, the second waveguide 120 can optionally be made of a second core material that is different from the first core material of the first waveguide 110.

For example, in the exemplary PIC structure embodiments 100(1) of FIGS. 1A-1F, 100(4) of FIGS. 4A-4F, 100(5) of FIGS. 5A-5F, 100(6) of FIGS. 6A-6F, 100(8) of FIGS. 8A-8F, and 100(9) of FIGS. 9A-9F, the second waveguide 120 is shown as being above the first waveguide 110. In this case, the second waveguide 120 can be embedded within the ILD material 160 such that it is immediately adjacent to the top surface of the uppermost additional cladding material layer 150 (as shown) or, alternatively, such that it is some distance above the top surface of the uppermost additional cladding material layer 150. Thus, for example, if the ILD material 160 (which functions as cladding for the second waveguide 120) and at least the uppermost additional cladding material layer 150 (which can also function as cladding for the second waveguide, e.g., if contacting the second waveguide) are silicon dioxide with a refractive index of smaller than 1.6, then the second core material of the second waveguide 120 could be silicon nitride with a refractive index of approximately 2.0 or aluminum nitride with a refractive index of approximately 2.16.

In any case, the shape of the second waveguide 120 can be patterned and etched from a second core material layer on the top surface of the uppermost additional cladding material layer 150. It should be noted that, during processing, the second waveguide 120 can be patterned and etched completely through the second core material layer. That is, the etch process used to form the second waveguide 120 can stop on the uppermost additional cladding material layer 150 such that the second waveguide 120 is a discrete shape with sidewalls that extend upward from the top surface of the uppermost additional cladding material layer 150 and, thus, such that the second waveguide 120 is considered a ridge waveguide (e.g., see the exemplary PIC structure embodiments 100(1) of FIGS. 1A-1F and 100(6) of FIGS. 6A-6F). Alternatively, during processing, the second waveguide 120 can be patterned and etched into the upper portion only of the second core material layer. That is, the etch process used to form the second waveguide can stop above a lower portion of the second core material layer such that the second waveguide 120 has sidewalls that extend upward from the lower portion of the second core material layer (i.e., a second slab portion 129) and, thus, such that the second waveguide 120 is considered a rib waveguide (e.g., see the exemplary PIC structure embodiments 100(4) of FIGS. 4A-4F, 100(5) of FIGS. 5A-5F, 100(8) of FIGS. 8A-8F and 100(9) of FIGS. 9A-9F). Optionally, before or after the shape for the second waveguide 120 is patterned and etched into the upper portion of the second core material layer, the shape of the second slab portion 129 can be patterned and etched. In some embodiments, the second slab portion 129 and the second waveguide 120 can be patterned and etched so that they have similar shapes with the second slab portion being larger than the second waveguide with the entire second waveguide structure extending upward from the second slab portion 129. In these embodiments, the second slab portion 129 can have either a solid flared end (e.g., see the exemplary PIC structure embodiments 100(4) of FIGS. 4A-4F and 100(8) of FIGS. 8A-8F) or a flared end split into two portions (e.g., see the exemplary PIC structure embodiments 100(5) of FIGS. 5A-5F and 100(9) of FIGS. 9A-9F). In some embodiments, the second core material layer can be patterned and etched so that the second main body 122 is rib-type and the second end portion 121 is ridge-type (not shown).

In the exemplary PIC structure embodiments 100(2) of FIGS. 2A-2F and 100(7) of FIGS. 7A-7F, the second waveguide 120 is shown as being below the first waveguide 110. In this case, the second waveguide 120 can be embedded in the substrate 101. Specifically, the substrate 101 can include a trench that has the desired shape of the second waveguide that is lined with a layer 125 of a suitable cladding material (e.g., silicon dioxide) and filled with the second core material (e.g., silicon nitride), thereby creating the second waveguide 120. It should be noted that the layer 125 should be sufficiently thick to prevent leakage of optical signals into the substrate 101. The insulator layer 102 can be on the top surface of the substrate 101 over the second waveguide 120. The first waveguide 110 can be on the insulator layer 102 with the first end portion 111 being aligned above the space between the two branch waveguides 123a-123b, as discussed above.

In each of the above-described PIC structure embodiments 100(1)-100(13), the two branch waveguides 123a-123b of the second end portion 121 of the second waveguide 120 provide additional paths for optical signals to travel between the first primary waveguide 110 and the second primary waveguide 120 as compared an arrangement where one tapered end of one waveguide is positioned adjacent to the tapered end of another waveguide. That is, the two branch waveguides 123a-123b of the second end portion 121 of the second waveguide 120 is adjacent to, but physically separated from, the first end portion 111. However, the separation distance between the these two branch waveguides 123a-123b of the second end portion 121 of the second waveguide 120 is sufficiently close to the first end portion 111 so that optical power may be coupled between the two waveguides 1110-120.

More specifically, as mentioned above, each of the exemplary PIC structure embodiments 100(1)-100(13), the two branch waveguides 123a-123b of the second end portion 121 of the second waveguide 120 are adjacent to the opposing sides 113a-113b of the first end portion 111 of the first primary waveguide 110. In operation, optical signals can pass between the first end portion 111 of the first waveguide 110 and each of the two branch waveguides 123a-123b of the second end portion 121 of the second waveguide 120 at any adjacent locations where mode matching occurs. The arrangement of the two branch waveguides 123a-123b of the second end portion 121 of the second waveguide 120 relative to the first end portion 111 of the first waveguide 110 allows for mode matching conditions to be met at multiple locations at the interface between the first waveguide 110 and the second waveguide 120, thereby creating multiple signal paths between the first and second waveguides and effectively reducing the light signal power density in any one path to prevent or at least minimize any power-induced damage.

Also disclosed herein are method embodiments for forming the above-described PIC structure embodiments. In these method embodiments, conventional waveguide processing techniques can be used to form the above-described first and second waveguides 110 and 120 However, using these techniques the first and second waveguides are specifically formed as described above. That is, the first waveguide can be formed so as to have a first main body and a first end portion, which is adjacent to the first main body and which is tapered. The second waveguide can be formed above, below or at the same level as the first waveguide and can further be formed so as to have a second main body and a second end portion, which is adjacent to the second main body and which has two branch waveguides that are positioned adjacent to opposing sides, respectively, of the first end portion of the first waveguide and that branch out from the second main body (i.e., forming a V, U or similar shape at one end of the second main body). This method is used in the fabrication of photonic integrated circuit (PIC) chips. The resulting PIC chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a first waveguide with a first main body and a first end portion, wherein the first end portion is a tapered end portion;
   a second waveguide with a second main body and second end portion,
     wherein the second end portion has two branch waveguides that branch out from the second main body,
     wherein the two branch waveguides of the second end portion of the second waveguide are adjacent to the first end portion of the first waveguide, at opposing sides thereof respectively, and
     wherein the first waveguide and the second waveguide are discrete waveguides with planar bottom surfaces at different heights above a substrate; and
   three cladding material layers stacked vertically between the discrete waveguides.

2. The structure of claim 1, wherein the first end portion of the first waveguide is below the second end portion of the second waveguide and laterally aligned between the two branch waveguides of the second end portion of the second waveguide.

3. The structure of claim 2, wherein the two branch waveguides of the second end portion of the second waveguide do not overlay the opposing sides of the first end portion of the first waveguide.

4. The structure of claim 2, wherein the two branch waveguides of the second end portion of the second waveguide overlay the opposing sides, respectively, of the first end portion of the first waveguide.

5. The structure of claim 1,
   wherein the first waveguide comprises a first core material, and
   wherein the second waveguide comprises a second core material that is different from the first core material.

6. The structure of claim 1, wherein each of the two branch waveguides are curved.

7. The structure of claim 1, wherein the two branch waveguides have different lengths.

8. A structure comprising:
   a first cladding material layer on a substrate;
   a first waveguide on the first cladding material layer, wherein the first waveguide has a first main body and a first end portion and wherein the first end portion is a tapered end portion;
   a second cladding material layer laterally surrounding the first waveguide;
   at least one additional cladding material layer having a first surface immediately adjacent to the second cladding material layer and the first waveguide and having a second surface opposite the first surface; and
   a second waveguide immediately adjacent to the second surface, wherein the second waveguide has a second main body and a second end portion, wherein the second end portion has two branch waveguides that branch out from the second main body, and wherein the two branch waveguides of the second end portion of the second waveguide are adjacent to the first end portion of the first waveguide, at opposing sides thereof respectively.

9. The structure of claim 8, wherein the first end portion of the first waveguide is below the second end of the second waveguide and laterally aligned between the two branch waveguides of the second end portion of the second waveguide and wherein the two branches of the second end portion of the second waveguide do not overlay the opposing sides of the first end portion of the first waveguide.

10. The structure of claim 8, wherein the first end portion of the first waveguide is below the second end of the second waveguide and laterally aligned between the two branch waveguides of the second end portion of the second waveguide and wherein the two branches of the second end portion of the second waveguide overlay opposing sides, respectively, of the first end portion of the first waveguide.

11. The structure of claim 8,
   wherein the first waveguide comprises a first core material, and
   wherein the second waveguide comprises a second core material that is different from the first core material.

12. A structure comprising:
a first waveguide with a first main body and a first end portion, wherein the first end portion is a tapered end portion; and
a second waveguide with a second main body and a second end portion,
wherein the second end portion has two branch waveguides that branch out from the second main body,
wherein the two branch waveguides of the second end portion of the second waveguide are adjacent to the first end portion of the first waveguide, at opposing sides thereof respectively,
wherein the first waveguide and the second waveguide are discrete waveguides with bottom surfaces at different heights above a substrate and are physically separated from each other by at least one cladding material layer,
wherein the at least one cladding material layer includes a silicon nitride layer stacked between two silicon dioxide layers, and
wherein the first end portion of the first waveguide is below the second end portion of the second waveguide and laterally aligned between the two branch waveguides of the second end portion of the second waveguide.

13. The structure of claim 12, wherein the two branch waveguides of the second end portion of the second waveguide do not overlay the opposing sides of the first end portion of the first waveguide.

14. The structure of claim 12, wherein the first waveguide comprises a monocrystalline silicon core material and the second waveguide comprises a silicon nitride core material.

15. The structure of claim 12, wherein the first waveguide comprises a first core material, and wherein the second waveguide comprises a second core material that is different from the first core material.

* * * * *